United States Patent
Moon et al.

(10) Patent No.: US 6,442,815 B1
(45) Date of Patent: Sep. 3, 2002

(54) RECONFIGURABLE AUTOMATIC TOOL CHANGER

(75) Inventors: Yong-Mo Moon, Ann Arbor; Sridhar Kota, Brighton, both of MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/551,668

(22) Filed: Apr. 18, 2000

(51) Int. Cl.[7] .......................... B23B 29/32; B23Q 3/157; B23C 1/12
(52) U.S. Cl. ........................... 29/40; 29/39; 29/48.5 R; 82/159; 408/35; 409/201; 409/211; 409/230; 483/31; 483/32
(58) Field of Search ............................. 483/56, 31, 32, 483/55, 54; 82/159; 408/35; 409/230, 216, 201, 211; 29/40, 39

(56) References Cited

U.S. PATENT DOCUMENTS

| | | | | |
|---|---|---|---|---|
| 3,406,607 A | * | 10/1968 | Hill | 29/40 X |
| 3,604,083 A | * | 9/1971 | Antonietto et al. | 29/26 R |
| 3,845,532 A | * | 11/1974 | Smith | 29/40 |
| 4,034,465 A | * | 7/1977 | Shelton | 483/1 |
| 4,090,281 A | * | 5/1978 | Hautau | 29/40 |
| 4,110,897 A | * | 9/1978 | Hipwell et al. | 483/10 |
| 4,297,925 A | * | 11/1981 | Ishizuka et al. | 408/35 |
| 4,429,443 A | * | 2/1984 | Kolblin et al. | 29/39 X |
| 4,656,726 A | * | 4/1987 | Suzuki et al. | 29/26 A |
| 4,715,102 A | * | 12/1987 | Wolf | 29/27 R |
| 4,872,244 A | * | 10/1989 | Schleich | 29/40 |
| 4,922,595 A | * | 5/1990 | Hattori et al. | 29/40 |
| 5,088,182 A | * | 2/1992 | Wagner et al. | 483/27 |
| 5,134,767 A | * | 8/1992 | Yasuda | 483/56 X |
| 5,146,663 A | | 9/1992 | Buessinger | 29/40 |
| 5,226,869 A | * | 7/1993 | Thumm | 483/1 |
| 5,300,006 A | | 4/1994 | Tanaka et al. | 483/56 |
| 5,452,503 A | * | 9/1995 | Yamamoto et al. | 29/40 |
| 6,016,729 A | * | 1/2000 | Pfeifer et al. | 408/35 X |

FOREIGN PATENT DOCUMENTS

| | | | | |
|---|---|---|---|---|
| FR | 2704789 | * | 11/1994 | 29/40 |
| JP | 51-124878 | * | 10/1976 | 29/40 |
| JP | 63-120004 | * | 5/1988 | 483/32 |
| JP | 64-78708 | * | 3/1989 | 29/40 |
| JP | 5-285873 | * | 11/1993 | 483/32 |

\* cited by examiner

*Primary Examiner*—William Briggs
(74) *Attorney, Agent, or Firm*—Gifford, Krass, Groh, Sprinkle, Anderson & Citkowski, PC (57) ABSTRACT

A reconfigurable tool changer allows a tool cartridge to be easily attached to, or detached from, a standard machine-tool spindle head. The modular design, includes a revolving tool cartridge having a plurality of tool holders, a meshing gear for engaging a tool holder with the spindle of the machine tool, and an adapter block for positioning the revolving tool cartridge on any standard machine-tool spindle head. The adapter block allows the automatic tool changer to be easily coupled to a wide variety of commercial machine-tool spindles, making the invention a truly reconfigurable and portable tool changer. The revolving tool cartridge incorporates a novel three-dimensional cam structure mechanism, which allows tool indexing to be achieved by means of only one actuator.

21 Claims, 9 Drawing Sheets

RECONFIGURABLE AUTOMATIC TOOL CHANGER

STATEMENT OF GOVERNMENT RIGHTS

This invention was made at least in part with Government support under NSF Contract No. EEC 9529125. The Government has certain rights to this invention.

FIELD OF THE INVENTION

In general, the present invention relates to automatic tool changers for machine tool spindles. More particularly, the invention relates to an automatic tool changer having a revolving holder to carry, index and drive a plurality of tools.

BACKGROUND OF THE INVENTION

Automatic tool changers have been developed in response to the need of the machine-tool industry to perform multiple operations in a single set up, to re-tool quickly in order to accommodate product designs that are changing in timely response to market demands, and to be able to replace quickly a worn out or broken part. The typical solution to this problem utilizes a large library of tools stored in a tool storage magazine and accessible through various mechanisms, such as rotating arms, robots, rails and the like.

Figure 1:
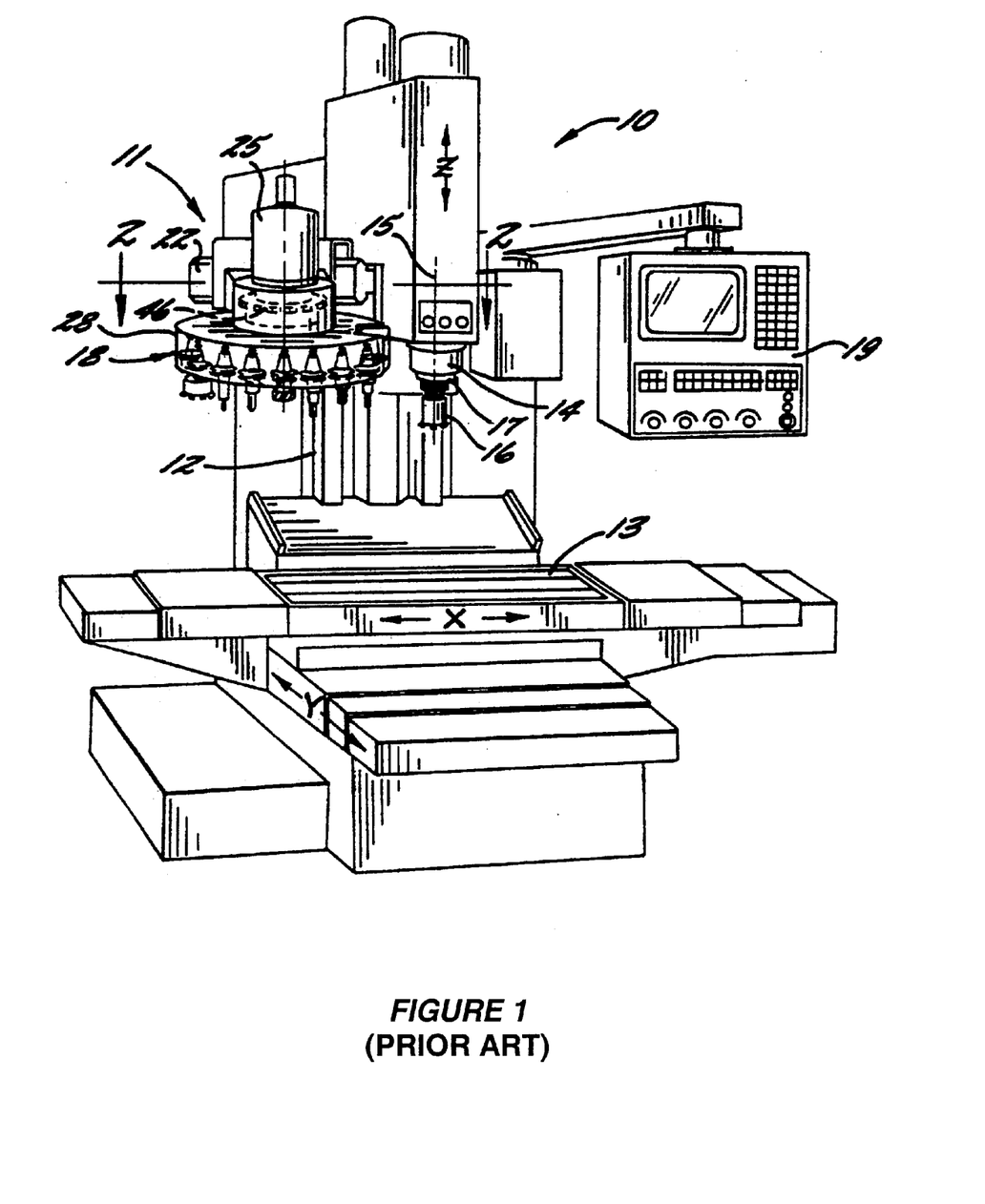
FIG. 1 is a drawing which shows a prior-art automatic tool changer disclosed in U.S. Pat. No. 5,300,006.

FIG. 1, for instance, shows the automatic tool changer described in U.S. Pat. No. 5,300,006 (JP 7060586), which incorporates a tool storage magazine mounted on a frame, the frame capable of sliding in and out of storage and rotating to replace a tool in a tool-engaging fixture, which is connected to the machine-tool spindle. The tool-changing operation is computer-controlled by means of an input terminal mounted on the machine frame. This type of solution to the frequent re-tooling problem produces large and complex tool changing equipment, which is expensive and cumbersome, at least for more modest operations or for operations requiring more flexibility and agility in response to changing market demands.

Figure 2:
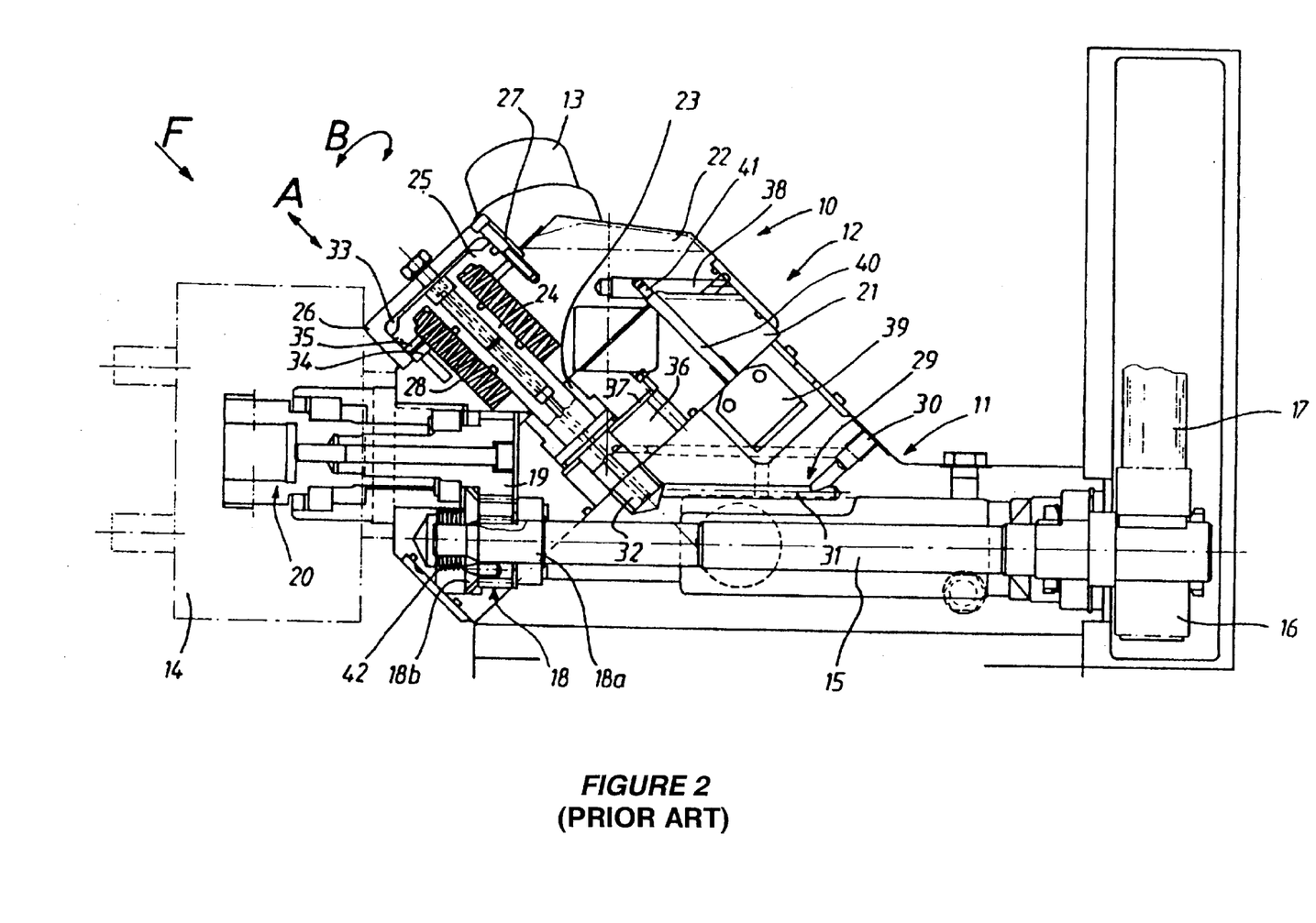
FIG. 2 is a drawing which shows a prior-art automatic tool changer disclosed in FIG. 2 of U.S. Pat. No. 5,146,663.

Another solution has been to house in the machine-tool spindle head an integrated tool cartridge or tool turret of about six different tools so that the proper tool is indexed into position as and when needed. A machine-tool revolving head, which is typical of the prior art and described in U.S. Pat. No. 5,146,663, is shown in FIG. 2. The prior-art revolving head incorporates a fixed frame, which is fitted with a turret having multiple tool-bearing spindles. The arrangement includes a driving shaft, which is connected at one end to a driving gear, and at the other end through a set of gears to the tool-bearing head of the spindle. The turret moves axially and rotates with respect to the frame by means of a hydraulic driving mechanism, which includes an axial piston, a rotary piston and a chamber.

One problem with integrating the turret or tool cartridge with the spindle head is that each time a new set of tools is needed, either the entire spindle head and tool turret assembly must be replaced, necessitating elaborate realignment procedures, or each tool must be replaced individually in a time-consuming and elaborate manner. To avoid realignment, save time and increase productivity while reconfiguring a machining system, it is desirable to be able to swap quickly a tool cartridge from one machine to another without elaborate procedures.

SUMMARY OF THE INVENTION

The subject invention provides a reconfigurable automatic tool changer (RATC), which allows a tool cartridge to be easily attached to or detached from any standard machine-tool spindle head. In the preferred embodiment, the reconfigurable automatic tool changer (RATC) is based on a modular design, comprising a revolving-head unit, or tool cartridge, having a plurality of tool holders, a meshing gear for engaging a tool holder with the spindle of the machine tool, and an adapter block for positioning the revolving-head unit on any standard machine-tool spindle head. The adapter block allows the RATC to be easily coupled to a wide variety of commercial machine-tool spindles, giving the subject invention a degree of portability not found in the prior art. The revolving head unit or tool cartridge also incorporates an inventive mechanism which allows tool indexing to be achieved by means of one actuator only, in contrast to prior art-designs.

This invention represents a substantial departure from prior art practice. In contrast to prior-art designs, the RATC is modular and portable, allowing the same revolving head-unit or tool cartridge to be used for various machine tool spindles. Compatibility is achieved by custom-designing the adapter block, rather than the revolving head, a task which is easier, more efficient and less costly. The tool holders on the revolving head are driven by the machine spindle head through a standard, off-the-shelf spur gear, which meshes with a corresponding gear on the tool holder. A single motor on the adapter block drives the revolving head unit and accomplishes the indexing function of the revolving head through a three-dimensional cam structure. This cam structure includes a set of bevel gears and indexing arms spaced at a distance equal to the radius of the cam circle, in order to accommodate three to six tools in a set.

The inventive design of the revolving-head unit or cartridge and the modularity of the entire adaptable automatic tool changer device create a simpler, more efficient and portable structure which is easier to reconfigure and does not require duplication of existing equipment in a manufacturing setting.

DETAILED DESCRIPTION OF THE INVENTION

Figure 3:
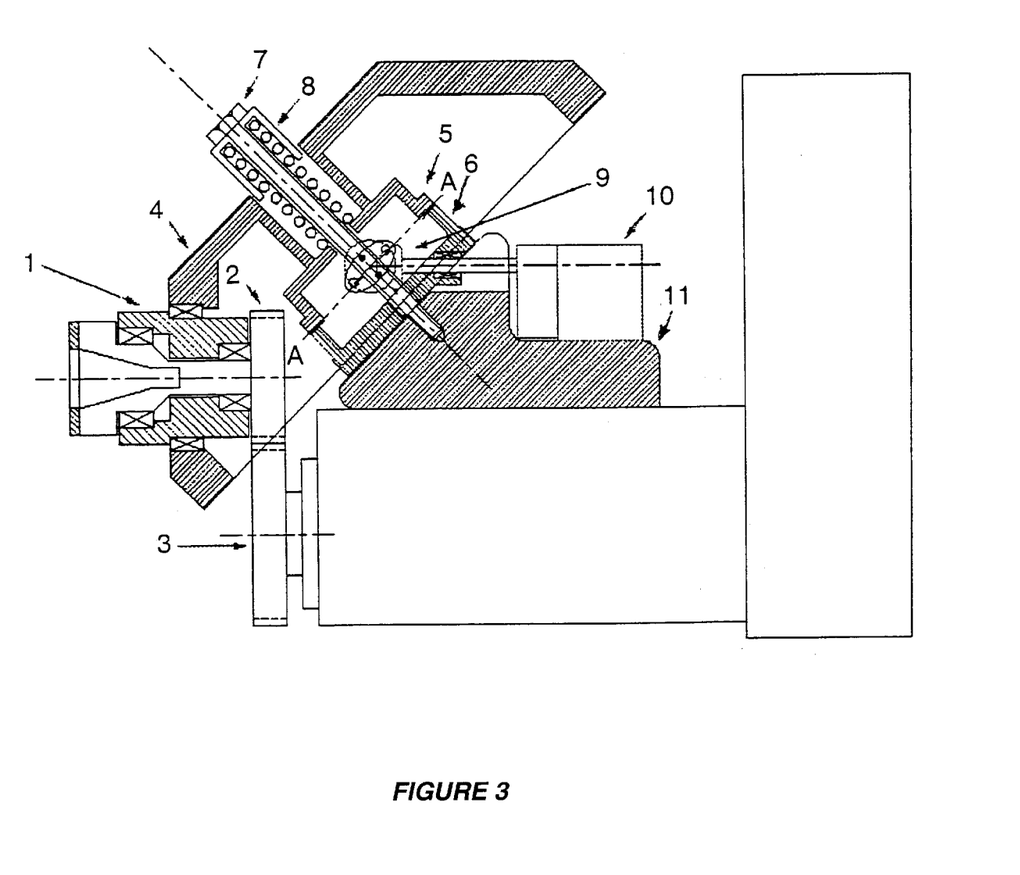
FIG. 3 is a side view of a preferred embodiment of the invention positioned on a machine-tool spindle.
Figure 4:
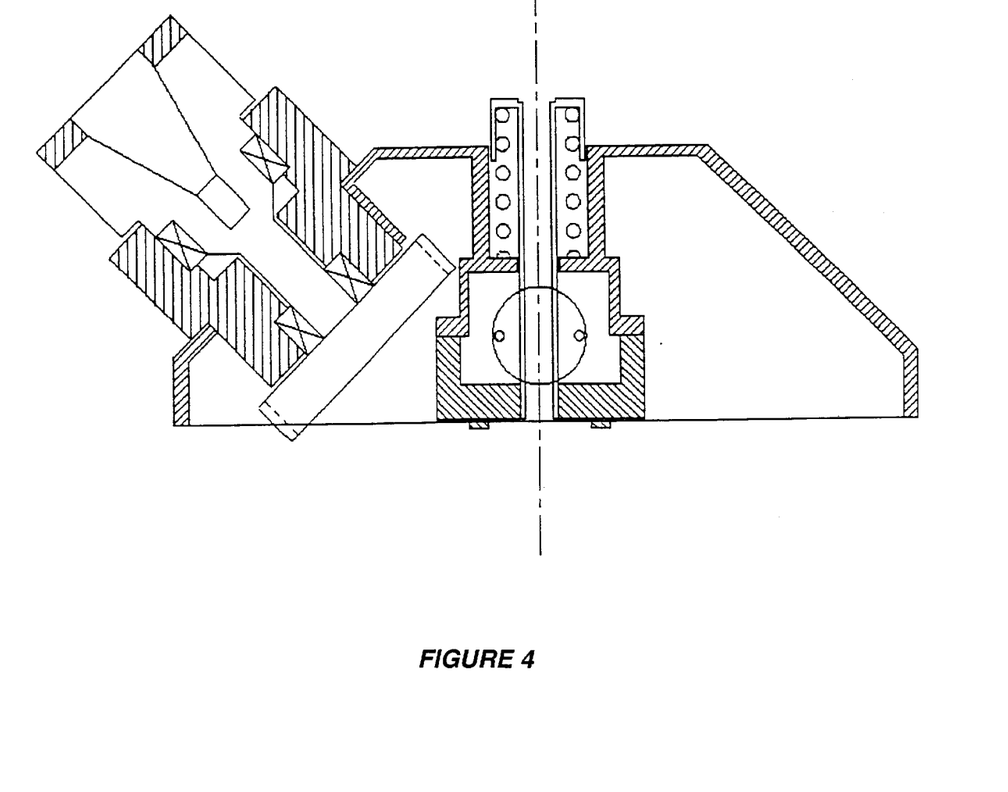
FIG. 4 is an enlarged view of the revolving-head unit (tool cartridge) of the invention.

Having discussed the prior-art systems of FIGS. 1 and 2, reference is made to FIG. 3, which shows a preferred embodiment of the reconfigurable tool changer according to the invention. A revolving head unit (cartridge) 4 includes a set of tool heads 1, typically three to six, and each tool head further incorporates a gear 2. The revolving head unit (cartridge) 4 incorporates an upper cam 5, and a lower cam 6 with an indexing and driving mechanism 9. An adapter block or unit 11 is used to position the revolving head unit (cartridge) 4 on the spindle of a machine tool. A meshing gear 3 is mounted on the machine-tool spindle and engages the selected tool head. A motor 10, typically sits on the adapter block 11 and engages the driving mechanism of the revolving head unit (cartridge) 4.

The motor and meshing gear are standard units, and may be acquired separately and kept on hand for use with more than one revolving head unit, if desirable. The adapter block 11 may be custom-made for each machine tool spindle head, if the machine tool configuration so requires, but making an adapter is a straightforward and inexpensive task.

The revolving head unit (tool cartridge) 4 is attached to the adapter block 11 by a rod 7 and spring unit 8, which are also designed to give added rigidity to the revolving head unit (cartridge), and can be custom-made for different applications. The axis of the revolving head unit (cartridge) 4 is at an angle, typically 45°, with the axis of the tool head In the embodiment shown in FIG. 3, the axis of the selected tool head is parallel to the axis of the machine-tool spindle when the meshing gear 3 and tool-head gear 2 are engaged. Gear 2 on the tool head and meshing gear 3 on the spindle are typically standard, off-the-self, spur gears, although it would be obvious to a person skilled in the art to replace these gears with a set of bevel gears to create alternate designs for situations requiring that the tool head axis and the axis of the spindle were not parallel. An additional way to accomplish the meshing of gears 2 and 3 in the event that their respective axes were not parallel would be to adjust the angle of the inclined face of the adapter block shown in FIG. 8.

Figure 8A:
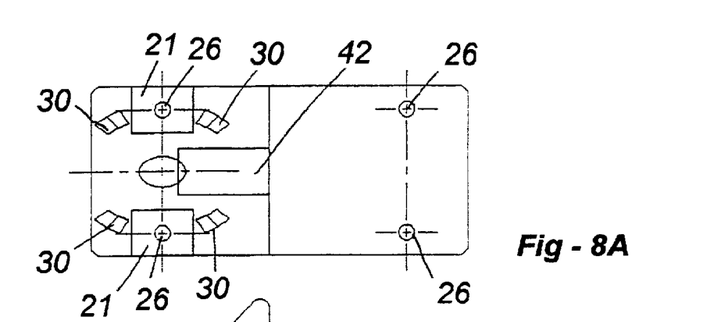
FIG. 8a is a top view of an embodiment of the adapter block.
Figure 8B:
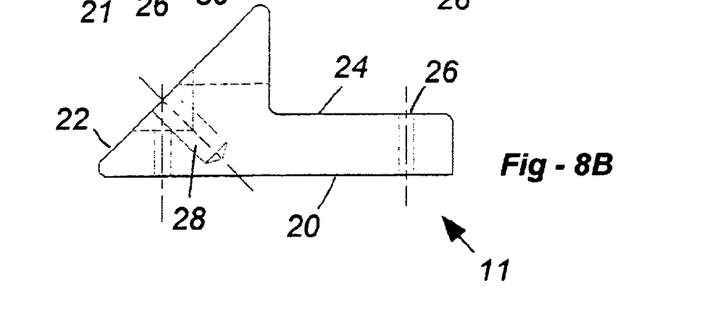
FIG. 8b is a side view of an embodiment of the adapter block.

FIGS. 8a and 8b show respectively a top view and side view of the adapter block or unit. The adapter unit 11 has a flat bottom surface 20 designed to rest on the machine-tool spindle head. The top surface of the adapter unit 11 has an angled section 22 on which the revolving head unit (cartridge) is positioned and, in the preferred embodiment, a flat surface 24 on which the motor driving the indexing mechanism sits.

Figure 7:
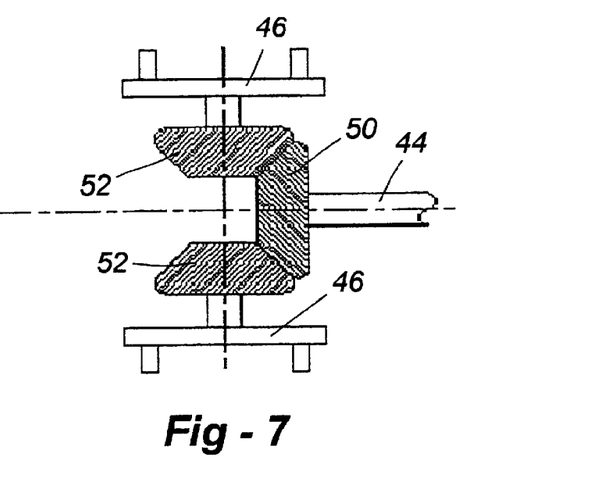
FIG. 7 shows the preferred embodiment of the indexing mechanism.

As mentioned, the adapter is typically custom-machined for a particular spindle. In other embodiments, the motor may be placed directly on top of the machine-tool spindle head. The adapter 11 is secured on the spindle head with screws or other fasteners, preferably through pre-drilled holes 26. The angled surface of the adapter block has a pre-tapped hole 28 to receive the adapting rod 7 (in FIG. 3) connecting the revolving head unit with the adapter block. In addition, there are four wedge holes 30 on the angled surface. These holes or apertures will receive the wedges 32 attached on the lower cam 6 (see FIGS. 5(b) and (d)) and will prevent the rotation of the lower cam 6 with respect to the adapter block. The adapter block has a slot 42 for a shaft 44 through which the driving mechanism, shown in FIG. 7, is connected with the motor. To facilitate access for fastening the adapter block onto the spindle head through the pre-drilled holes 26, cutouts 21 may be conveniently machined on the adapter block.

Figure 5A:
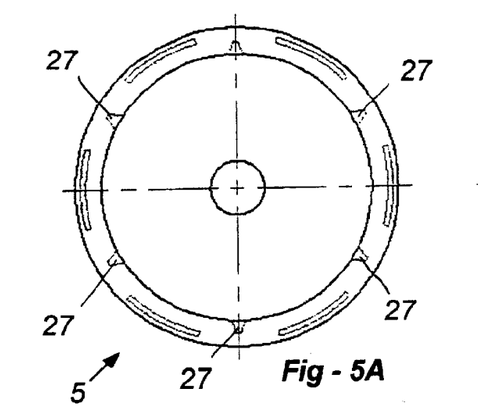
FIG. 5a is a plan view of an embodiment of the upper cam according to the invention.
Figure 5B:
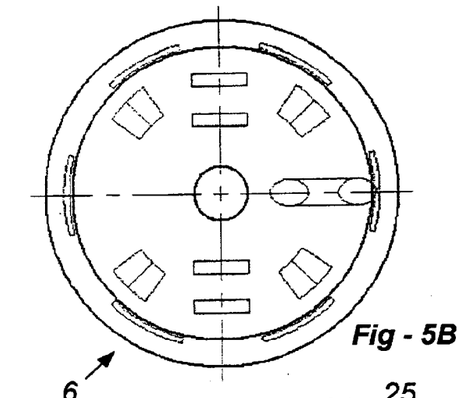
FIG. 5b is a plan view of an embodiment of the lower cam according to the invention.
Figure 5C:
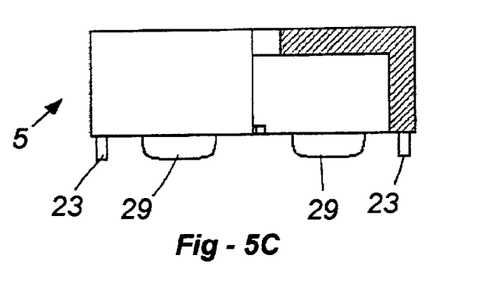
FIG. 5c is a side view of an embodiment of the upper cam according to the invention.
Figure 5D:
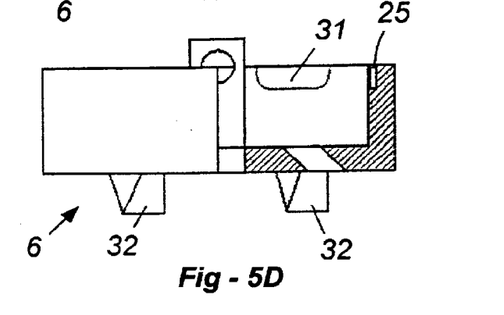
FIG. 5d is a side view of an embodiment of the lower cam according to the invention.

The revolving head unit (cartridge) 4 employs an inventive special three-dimensional cam structure to reduce the number of actuators needed to index the revolving head unit (cartridge). The cam structure includes a circular upper cam 5 and a circular lower cam 6 as shown in FIG. 3 and in more detail in FIG. 5. Plan views of the upper and lower cams are shown in FIGS. 5a and 5b, respectively. The upper cam is engaged to the lower cam through pegs 23 received by holes 25, and through lugs 29 fitting into slots 31. The lugs 29 and slots 25 have a cycloid profile, so that there is no interference as the upper cam lifts and rotates about its axis by means of the driving mechanism.

Figure 6:
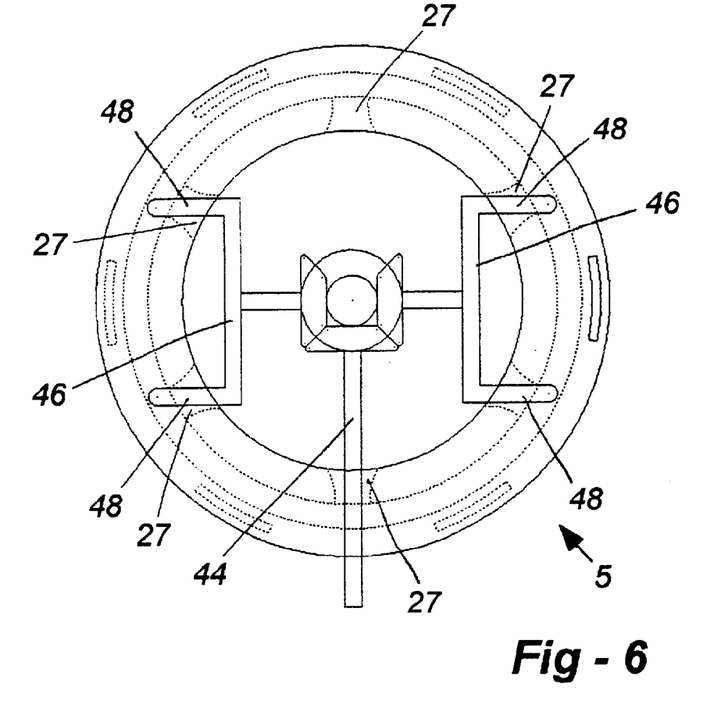
FIG. 6 is a plan view of the cam with the driving mechanism.

FIG. 6 shows the driving mechanism and the indexing mechanism. The indexing mechanism includes two plates 46, each plate having two rods or indexing arms 48. The plates are connected to the bevel gears of the driving mechanism, an embodiment of which is shown in FIG. 7. When the distance between the indexing arms 48 is equal to the radius of the cam circle, so that the indexing arms 48 can engage the upper cam through six grooves 27 equally spaced along the circumference of the upper cam, the revolving head unit (tool cartridge) can support six tool holders. The grooves 27 have involute profiles so that they can engage with the straight rods 48.

Figure 12A:
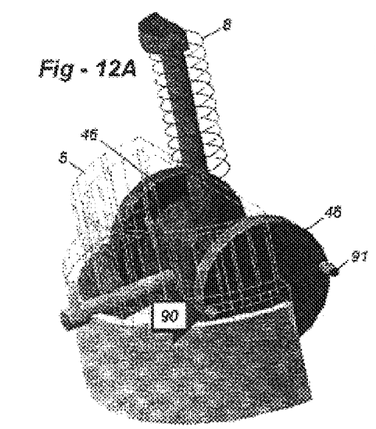
FIGS. 12a through 12e show a model of the indexing mechanism in five progressive positions a through e.
Figure 12B:
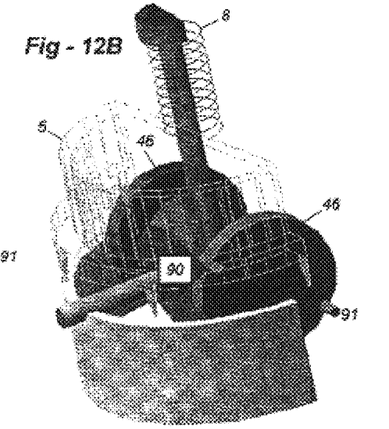
Figure 12C:
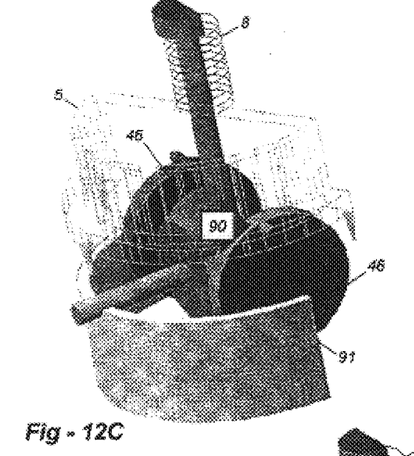
Figure 12D:
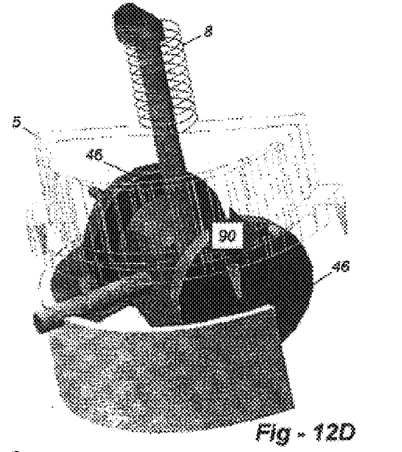
Figure 12E:
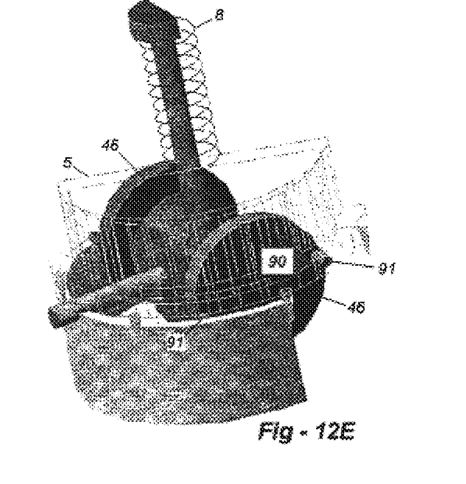

Two diametrically opposite rods are in the respective grooves at all times. Shaft 44 is connected to a motor and drives the bevel gear 50, which is engaged to bevel gears 52 in FIG. 7 connected to plates 46. As the plates rotate, the indexing arms 48 cause the revolving head unit (cartridge) and attached upper cam to lift, compressing the spring in the spring unit 8, and rotate with respect to the lower cam so that one of the tool holders comes into alignment with the spindle head axis. FIG. 12 illustrates the rotation and lift of the upper cam in five progressive positions, FIGS. 12a through 12e. At the position of FIG. 12a, the spring 8 is not compressed, and the plane formed by the visible indexing rods 90, 91 is horizontal, while the upper cam 5 and lower cam 6 are engaged. At the position of FIG. 12b, the plates 46 have rotated lifting the upper cam 5 and causing the spring 8 to be compressed as the indexing rods 90, 91 form a plane at an angle with the horizontal. At the position of FIG. 12c, further rotation brings the upper cam 5 to its maximum lift and the spring to its maximum compression, while the plane formed by the indexing rods 90, 91 is vertical. Further rotation lowers the upper cam 5 and relaxes some of the spring compression, as shown in FIG. 12d. Finally, at the position of FIG. 12e, the upper cam 5 is lowered to a new position engaging with the lower cam 6 and the spring has returned to its original length. The plane formed by the indexing rods 90, 91 is horizontal again, but the rods have exchanged their position through a 180° rotation. When six grooves are present, a 60° rotation causes the next tool holder to be rotated in position for engagement with the spindle head. The distance between indexing rods can be adjusted so that the revolving head unit (cartridge) may accommodate a different number of tool holders, in which case the angle of rotation will change accordingly.

Figure 9:
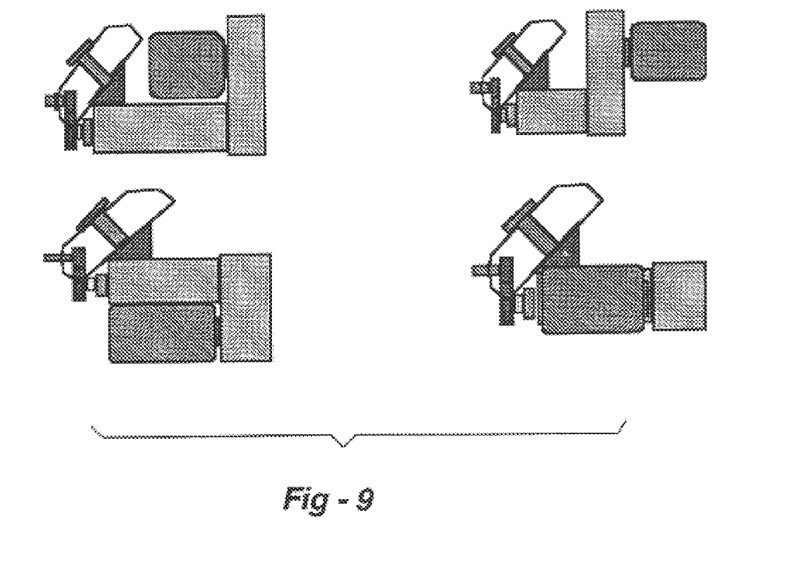
FIG. 9 shows the use of the invention in different types of commercial spindles.

FIG. 9 illustrates four examples of using the reconfigurable automatic tool changer with different types of commercial spindle heads. The adapter block is designed in each instance to accommodate differences in the geometry of the machine tool spindle.

Figure 10A:
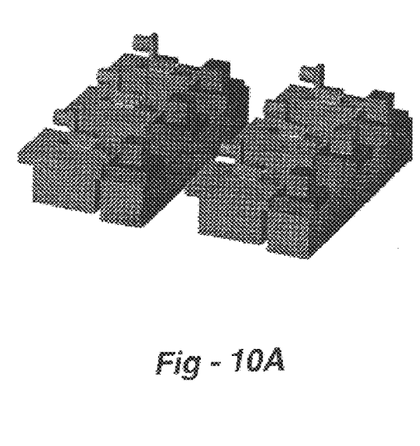
FIG. 10a shows a production transfer line before reconfiguration.
Figure 10B:
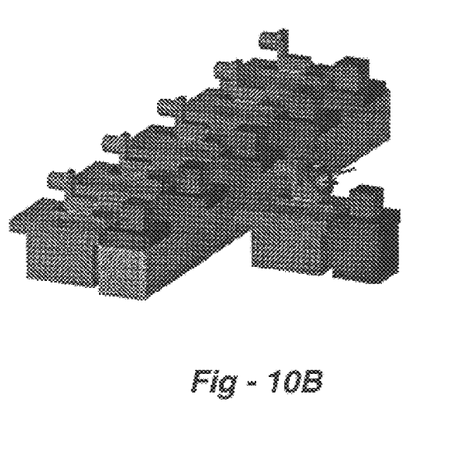
FIG. 10b shows a production transfer line after reconfiguration using the invention.

FIG. 10 illustrates the use of the automatic tool changer to reconfigure a production transfer line in response to changes in production volume. Before reconfiguration, two products have the same demand, and each go through a transfer line of three machine tools, e.g. drilling, reaming, tapping, FIG. 10a. When the demand for one product drops, while the demand for another increases, the two lines can be quickly reconfigured using the subject invention. The six machines are rearranged so that one transfer line includes five dedicated machines (one drilling, two reaming and two tapping machines) for the product with increased demand. The other line simply uses one machine, which is now equipped with a RATC that incorporates drilling, reaming and tapping tools, FIG. 10b, for the product with the decreased demand.

FIG. 11 illustrates how to accommodate frequent changes in production requirements by simply changing the tool cartridge (i.e. the revolving head unit (cartridge) of the RATC) on the adapter already sitting on the machine-tool spindle head, or by changing the set of tools in the cartridge. Tool cartridges housing a small number of tools provide an efficient way to accomplish the required reconfiguration, because they do not tie up a large number of tools in a fixed configuration that may experience repeated downtime periods, and they can be quickly replaced without the need for realignment.

Figure 11A:
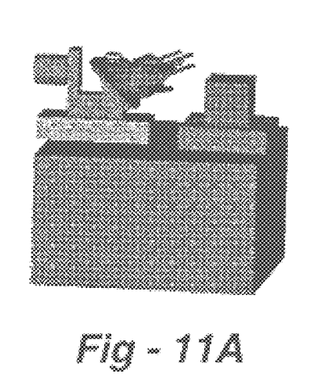
FIG. 11a shows a machine tool using the invention with a cartridge including a four-bit gang drill and a four-bit reamer.
Figure 11B:
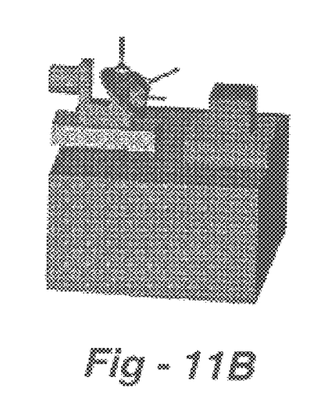
FIG. 11b shows a machine tool using the invention with a cartridge including a drilling, a reaming and a tapping tool.
Figure 11C:
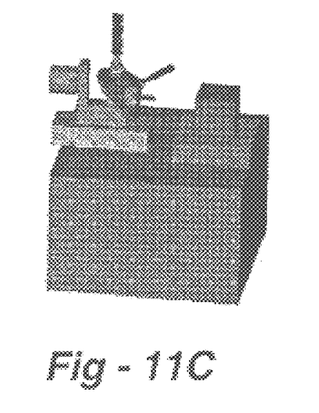
FIG. 11c shows a machine tool using the invention with a cartridge including three drill bits of different sizes.

In particular, FIG. 11 shows the reconfiguration of a machine tool for three different products. FIG. 11a shows a cartridge having a four-bit gang drill and a four-bit reamer, FIG. 11b shows a cartridge including a drilling, a reaming and a tapping tool, and FIG. 11c shows a cartridge having three drill bits of different sizes.

Although the indexing and driving mechanism described represent the preferred embodiment, other commercially available similar means may be used to accomplish the same purpose. The advantage of the design of the preferred embodiment is that it only requires one actuator for the indexing motion, and it uses simple and commonly available components, such as bevel gears.

The overall design of this reconfigurable tool changer offers the advantages of a modular design, in which the same basic resources, i.e. a revolving head unit (cartridge) with a number of tool holders, are portable and can be used in any type of spindle, by adding an adapter block and a meshing gear. The easily reconfigurable and modular design achieves quick assembly or disassembly of the tool cartridge from the spindle, thereby improving machine-tool utilization time and increasing productivity.

We claim:

1. A tool changer adapted for use with multiple different machine tools having in common a motor driven spindle head rotatable about a first axis, the tool changer comprising:
   a drive gear mountable on the spindle head for rotation by the machine tool;
   a head unit rotatable about a second axis;
   a plurality of tool heads mounted on the head unit, each tool head having a tool head gear, the head unit being indexable with respect to a plurality of discrete positions, but wherein, in each position, the tool head gear of one of the tool heads meshes with the drive gear such that the tool head is driven by the spindle head; and
   an adapter block for removably mounting the head unit for operative engagement with the drive gear without changing the spindle head.

2. The tool changer of claim 1, wherein the adapter block further includes a mechanism for indexing the head unit.

3. The tool changer of claim 2, wherein the mechanism further includes a motor-driven cam structure for indexing the head unit.

4. A tool changer adapted for use with multiple different machine tools having in common a motor driven spindle head rotatable about a first axis, the tool changer comprising:
   a head unit mounted relative to said spindle head rotatable about a second axis;
   a plurality of tool heads, each having a tool head gear, said tool heads mounted on the head unit, the head unit being rotatably indexable with respect to a plurality of discrete positions, but wherein, in each position, one of the tool heads is driven by a gear mounted on the spindle head; and
   an indexer for indexing the tool changer to the plurality of discrete positions, the indexer being driven by a single actuator.

5. The tool changer according to claim 4, wherein the indexer comprises a cam structure and the single actuator comprises a motor.

6. The tool changer according to claim 5, wherein the cam structure of the indexer comprises:
   a first cam;
   a second cam;
   engagement members for interlocking the first and second cams in a plurality of discrete positions;
   a spring operable to urge the first and second cams into engagement such that the engagement members interlock the cams in one of the discrete positions;
   indexing arms operable to:
      separate the first and second cams to disengage the engagement members;
      rotate the second cam with respect to the first cam; and
      release the cams such that the spring urges the cams back into engagement in a different one of the discrete positions.

7. The tool changer according to claim 6, wherein the indexing arms are supported on plates that are driven by the single motor.

8. A tool changer adapted for use with multiple different machine tools having in common a motor driven spindle head rotatable about a first axis, the tool changer comprising:
   a head unit rotatable about a second axis;
   a plurality of tool heads mounted on the head unit, the head unit capable of rotating to bring each tool head into position to be driven by the spindle head;
   means for indexing the tool heads comprising:
      a motor;
      a cam structure;
      a first bevel gear connected to the motor;
      a first and second plate, each plate having two indexing arms engaging the cam structure; and
      a second and third bevel gear, the second bevel gear connected to the first bevel gear and the first plate, and the third bevel gear connected to the first bevel gear and the second plate; and mean for removably mounting the head unit to each machine tool.

9. A tool changer adapted for use with multiple different machine tools having in common a motor driven spindle head rotatable about a first axis, the tool changer comprising:
- a head unit rotatable about a second axis, the angle between the first and second axes being 45°;
- a plurality of tool heads mounted on the head unit, the head unit capable of rotating to bring each tool head into position to be driven by the spindle head; and
- means for removably mounting the head unit to each machine tool.

10. A tool changer adapted for use with multiple different machine tools having in common a motor driven spindle head rotatable about a first axis, the tool changer comprising:
- a drive gear mountable on the spindle head for rotation by the machine tool;
- a head unit rotatable about a second axis;
- a plurality of tool heads mounted on the head unit, each tool head having a tool head gear, the head unit being indexable with respect to a plurality of discrete positions, but wherein, in each position, the tool head gear of one of the tool heads meshes with the drive gear such that the tool head is drive n by the spindle head; and
- an adapter block for removably mounting the head unit to each machine tool, the adapter block having a top and a bottom machined surface, the top surface having a portion adapted to attach to the revolving head unit, and a bottom surface adapted to attach to the surface of a machine-tool spindle head.

11. The tool changer of claim 10, wherein the head unit houses a cam structure engaged with means for indexing the head unit.

12. The tool changer of claim 11, wherein the means for indexing the tool heads is a motor engaging the cam structure.

13. A tool changer adapted for use with multiple different machine tools having in common a spindle head rotatable about a first axis, the tool changer comprising:
- a head unit rotatable about a second axis;
- a plurality of tool heads mounted on the head unit, the head unit capable of rotating to bring each tool head into position to be driven by the spindle head;
- means for indexing the tool heads comprising;
  - a motor;
  - a cam structure;
  - a first bevel gear connected to the motor;
  - a first and second plate, each plate having two indexing arms engaging the cam structure; and
  - a second and third bevel gear, the second bevel gear connected to the first bevel gear and the first plate, and the third bevel gear connected to the first bevel gear and the second plate; and
- an adapter block for removably mounting the head unit to each machine tool, the adapter block having a top and a bottom machined surface, the top surface having a portion adapted to attach to the revolving head unit, and a bottom surface adapted to attach to the surface of a machine-tool spindle head.

14. The tool changer of claim 1 wherein the first and second axes are at an angle.

15. The tool changer of claim 10, wherein the first and second axes are at an angle.

16. A tool changer adapted for use with multiple different machine tools having in common a motor driven spindle head rotatable about a first axis, the tool changer comprising:
- a head unit rotatable about a second axis, the angle between the first and second axes being 45°;
- a plurality of tool heads mounted on the head unit, the head unit capable of rotating to bring each tool head into position to be driven by the spindle head; and
- an adapter block for removably mounting the head unit to each machine tool, the adapter block having a top and a bottom machined surface, the top surface having a portion adapted to attach to the revolving head unit, and a bottom surface adapted to attach to the surface of a machine-tool spindle head.

17. A tool changer adapted for use with multiple different machine tools having in common a motor driven spindle head rotatable about a first axis, the machine tool having a drive gear mounted on the spindle head such that the machine tool is operable to rotate the drive gear, the tool changer comprising:
- a head unit rotatable about a second axis;
- a plurality of tool heads mounted on the head unit, each tool head having a tool head gear, the head unit being indexable with respect to a plurality of discrete positions, but wherein, in each position, the tool head gear of one of the tool heads meshes with the drive gear such that the tool head is driven by the spindle head; and
- a mount for removably mounting the head unit to each machine tool.

18. The tool changer according to claim 17, further comprising:
- an indexer for indexing the tool changer to the plurality of discrete positions, the indexer being driven by a single actuator.

19. The tool changer according to claim 18, wherein the indexer comprises a cam structure and the single actuator comprises a motor.

20. The tool changer according to claim 19, wherein the cam structure of the indexer comprises:
- a first cam;
- a second cam;
- engagement members for interlocking the first and second cams in a plurality of discrete positions;
- a spring operable to urge the first and second cams into engagement such that the engagement members interlock the cams in one of the discrete positions;
- indexing arms operable to:
  - separate the first and second cams to disengage the engagement members;
  - rotate the second cam with respect to the first cam; and
  - release the cams such that the spring urges the cams back into engagement in a different one of the discrete positions.

21. The tool changer according to claim 20, wherein the indexing arms are supported on plates that are driven by the single motor.

* * * * *